US012646333B2

(12) United States Patent (10) Patent No.: US 12,646,333 B2
Brew et al. (45) Date of Patent: Jun. 2, 2026

(54) REAL-TIME RECOGNITION OF RELEVANT OBJECTS IN IMAGES

(71) Applicant: INTERNATIONAL BUSINESS MACHINES CORPORATION, Armonk, NY (US)

(72) Inventors: Kevin W. Brew, Niskayuna, NY (US); Michael S. Gordon, Croton on Hudson, NY (US); Brian Paul Gaucher, Brookfield, CT (US); Matthew Beck, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 18/497,026

(22) Filed: Oct. 30, 2023

(65) Prior Publication Data

US 2025/0139982 A1 May 1, 2025

(51) Int. Cl.
*G06V 20/58* (2022.01)
*G06V 10/74* (2022.01)
*G06V 20/62* (2022.01)
*G06V 40/20* (2022.01)

(52) U.S. Cl.
CPC ............ *G06V 20/58* (2022.01); *G06V 10/761* (2022.01); *G06V 20/62* (2022.01); *G06V 40/20* (2022.01)

(58) Field of Classification Search
CPC ...... G06V 20/58; G06V 10/761; G06V 20/62; G06V 40/20; G06V 20/582
See application file for complete search history.

(56) References Cited

U.S. PATENT DOCUMENTS

| | | | |
|---|---|---|---|
| 9,697,430 B2 | 7/2017 | Kristensen | |
| 10,179,607 B2 | 1/2019 | Hawes et al. | |
| 10,325,339 B2 | 6/2019 | Lee et al. | |
| 10,438,465 B1 * | 10/2019 | Bart ......................... | G06T 7/70 |
| 11,482,012 B2 | 10/2022 | Lin et al. | |

(Continued)

FOREIGN PATENT DOCUMENTS

| | | |
|---|---|---|
| CN | 206161858 U | 5/2017 |
| CN | 111811533 B | 1/2022 |

(Continued)

OTHER PUBLICATIONS

Aleotti, et al., "Real-Time Single Image Depth Perception in the Wild with Handheld Devices", MDPI, Sensors, 2021, Published Dec. 22, 2020, 17 pages, Retrieved from the Internet: <https://www.ncbi.nlm.nih.gov/pmc/articles/PMC7792771/>.

(Continued)

*Primary Examiner* — Ming Y Hon

(74) *Attorney, Agent, or Firm* — Tihon Poltavets

(57) ABSTRACT

A computer-implemented method, a computer system and a computer program product recognize relevant objects in images in real time. The method includes capturing an image of a surrounding environment using a device. The method also includes identifying an object and a shape of the object in the image of the surrounding environment using a computer vision algorithm. The method further includes determining that the object is a relevant object based on the shape of the object. Lastly, the method includes performing an operational action based on the relevant object.

15 Claims, 2 Drawing Sheets

(56) References Cited

U.S. PATENT DOCUMENTS

| | | | |
|---|---|---|---|
| 2020/0000180 A1* | 1/2020 | Sherrah | A43D 1/025 |
| 2020/0184262 A1* | 6/2020 | Chui | G16H 50/70 |
| 2020/0320316 A1* | 10/2020 | Lin | G06N 3/0499 |
| 2021/0004363 A1* | 1/2021 | Bailly | G06T 17/05 |
| 2021/0089796 A1* | 3/2021 | Lu | G06V 20/582 |
| 2022/0036522 A1* | 2/2022 | Lee | G06T 7/13 |
| 2022/0135074 A1 | 5/2022 | Armstrong-Crews et al. | |
| 2022/0207885 A1* | 6/2022 | Ansari | H04L 9/14 |
| 2022/0327442 A1* | 10/2022 | Persia | G06F 16/24568 |
| 2022/0379913 A1* | 12/2022 | Rodriguez Hervas | B60W 60/001 |
| 2025/0116526 A1* | 4/2025 | Huang | G01C 21/3811 |
| 2025/0131572 A1* | 4/2025 | Rim | G06T 7/0002 |

FOREIGN PATENT DOCUMENTS

| | | | |
|---|---|---|---|
| DE | 102014217877 A1 | 3/2015 | |
| JP | 4450532 B2 | 4/2010 | |
| WO | 2020064543 A1 | 4/2020 | |

OTHER PUBLICATIONS

Ayachi, et al., "To Perform Road Signs Recognition for Autonomous Vehicles Using Cascaded Deep Learning Pipeline", Artificial Intelligence Advances, vol. 01, Issue 01, Apr. 2019, 10 pages, <https://www.researchgate.net/publication/334578256_To_Perform_Road_Signs_Recognition_for_Autonomous_Vehicles_Using_Cascaded_Deep_Learning_Pipeline>.

Lee, et al., "Speed change discrimination for motion in depth using constant world and retinal speeds", PLOS ONE, Apr. 3, 2019, pp. 1-21, Retrieved from the Internet: <https://www.ncbi.nlm.nih.gov/pmc/articles/PMC6447190/>.

* cited by examiner

100

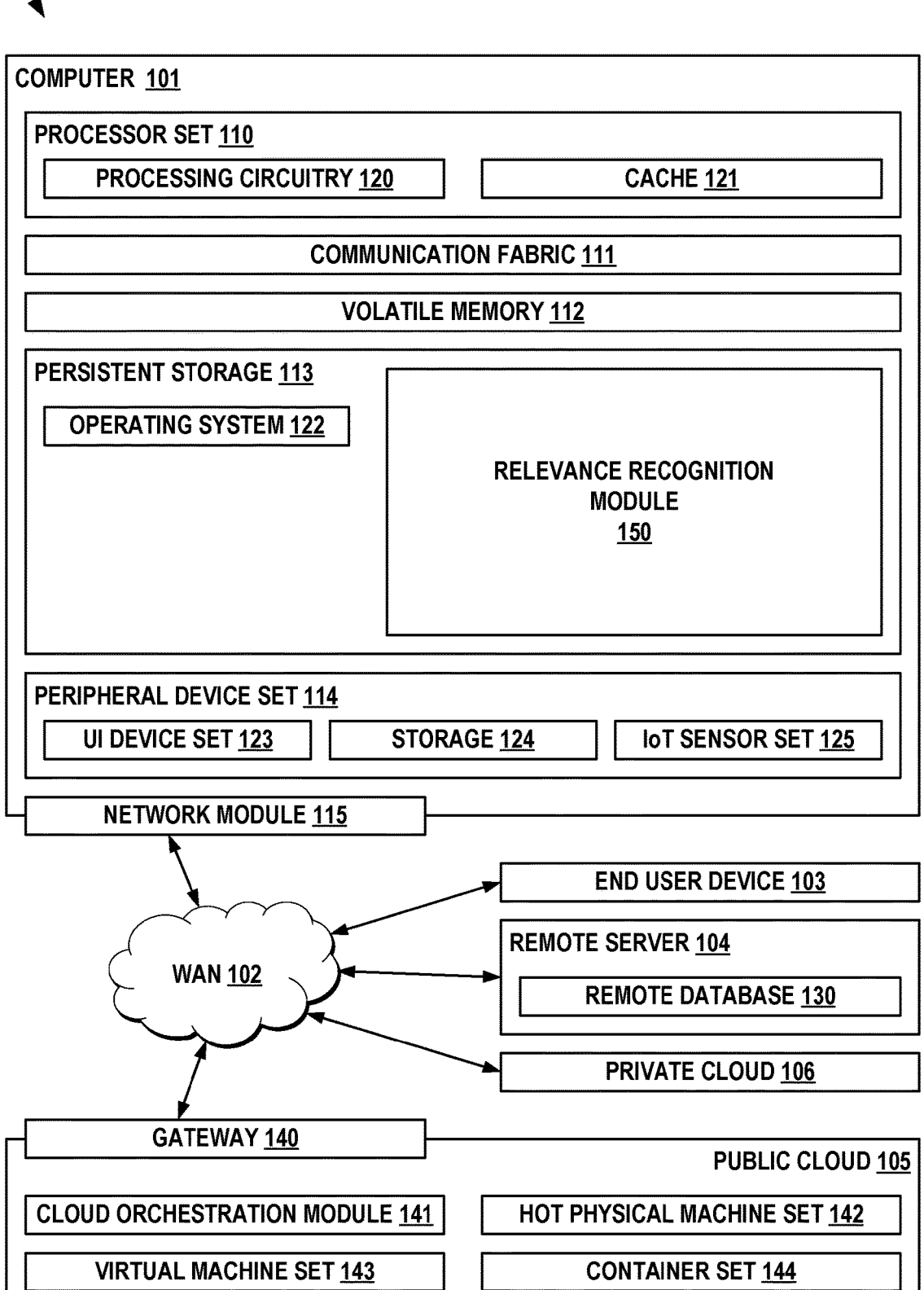

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

RELEVANCE RECOGNITION
MODULE
150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOT PHYSICAL MACHINE SET 142

VIRTUAL MACHINE SET 143          CONTAINER SET 144

FIG. 1

REAL-TIME RECOGNITION OF RELEVANT OBJECTS IN IMAGES

BACKGROUND

Embodiments relate generally to the field of real-time computer vision techniques and, more specifically, to recognizing relevant objects within images of a surrounding environment in real time.

In today's technology ecosystem, computer vision algorithms such as image recognition have matured and may allow for a high level of accuracy in real time, such that an object may be recognized quickly with a high degree of detail, including changes in the shape or size of the object over a period of time. In many applications that use such techniques in real-time, such as autonomous vehicles, it may be critical to recognize an object's position relative to other entities in a surrounding environment, as well as understand that object's relevance to the entities in that surrounding environment.

SUMMARY

An embodiment is directed to a computer-implemented method for recognition of relevant objects in images in real time. The method may comprise capturing an image of a surrounding environment using a device. The method may also comprise identifying an object and a shape of the object in the image of the surrounding environment using a computer vision algorithm. The method may further comprise determining that the object is a relevant object based on the shape of the object. Lastly, the method may comprise performing an operational action based on the relevant object.

In an embodiment, where the image of the surrounding environment may be captured at an initial time, the method may comprise capturing a second image of the surrounding environment at a time later than the initial time and identifying the object and a second shape of the object in the second image of the surrounding environment. In this embodiment, the method may also comprise generating a difference between the shape of the object and the second shape of the object and determining that the object is a relevant object based on the difference between the shape and the second shape.

In another embodiment, a machine learning model that predicts an association between the object in the image of the surrounding environment to an entity that captured the image is used to determine that the object is a relevant object.

In an additional embodiment, the method may further comprise identifying the relevant object in an object database and obtaining the operational action from the object database.

In a further embodiment, the identifying the shape of the object may comprise determining an aspect ratio of the object.

In yet another embodiment, the method may further comprise identifying text on the relevant object using a text recognition algorithm and determining the operational action based on the text on the relevant object using a natural language processing algorithm.

In another embodiment, the method may further comprise displaying a determination that the object is a relevant object to a user, monitoring interactions of the user with the determination that the object is a relevant object, and determining that the object is a relevant object based on the interactions of the user.

In addition to a computer-implemented method, additional embodiments are directed to a computer system and a computer program product for recognition of relevant objects in images in real time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 depicts a block diagram of an example computer system in which various embodiments may be implemented.

DETAILED DESCRIPTION

Figure 2:
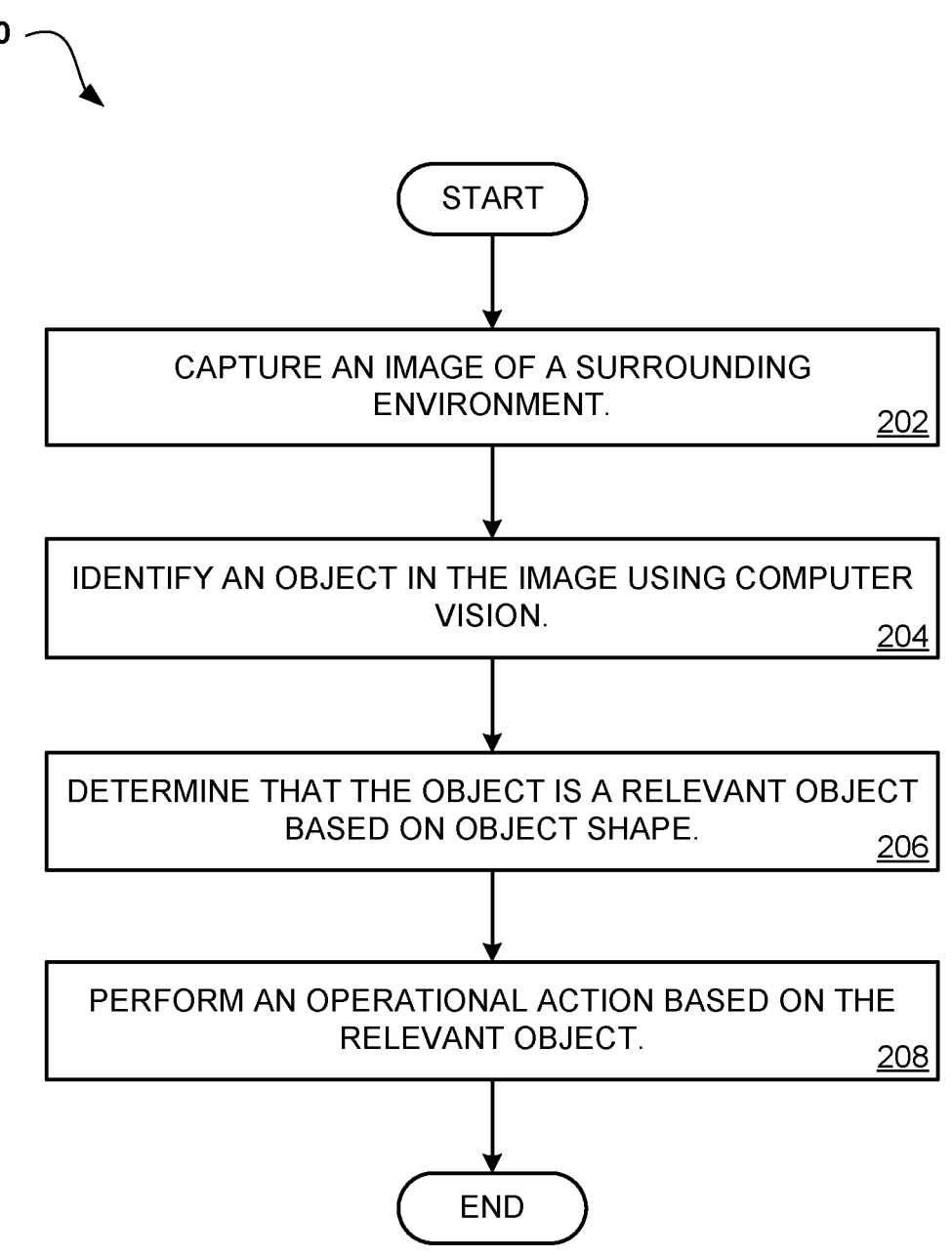
FIG. 2 depicts a flow chart diagram for a process to recognize relevant objects in images in real time according to an embodiment.

In many applications that use computer vision algorithms in real-time, such as autonomous vehicles, it may be critical to recognize both an object's position relative to other entities in a surrounding environment and a relevance of the object to the entity that may recognize the object. For instance, in a self-driving vehicle (SDV) context, a Do-Not-Enter sign may be recognized by a vehicle but may not be intended for that vehicle, but rather for vehicles travelling in a different direction. In such an instance, the recognized sign may be angled such that the sign may be recognized by a vehicle when the sign is not relevant to that vehicle. As the technology ecosystem has matured, computer vision algorithms such as image recognition have become more capable of a high level of accuracy in real time, such that an object may be recognized quickly with a high degree of detail, including changes in the shape or size of the object over a period of time. Many image recognition techniques can recognize an object that may have an altered orientation or shape, such as a rotated or angled road sign in the autonomous vehicle example above, but do not customarily use the geometrical information, e.g., shape or aspect ratio, post-recognition to see if the recognized object, e.g., the road sign above, is relevant to the entity that may recognize the object.

It may therefore be useful to provide a method or system to recognize relevant objects in images in real time using the shape or aspect ratio of the recognized object. For example, in a case where an object may be in motion relative to another entity that may be capturing the image of the object, acceleration in the size of the object while approaching at constant speed, and changes in the shape, e.g., aspect ratio, of a known detected object may be used to determine relevance of the object, e.g., whether a road sign is facing a vehicle and whether the sign is relevant to the vehicle, which may increase accuracy of critical image recognition and relevancy to artificial intelligence, such as an autonomous vehicle, where the artificial intelligence may be making driving decisions, in the case of the autonomous vehicle, or any other critical decisions that may depend on proper determination of relevance of the object. It should be noted that there may be many considerations in determining relevance of an object, especially in the autonomous vehicle context. For example, road signs may be twisted from vandalism or move with the wind, where a road sign may bend about a joint in the pole supporting the road sign. In such a case, there may be a concern that the vehicle may pass a stop sign because it was angled, and therefore misinterpreted as not relevant to the vehicle. It may also be possible to determine distance from an object to the entity that may recognize the object by comparing a captured image to known size data from a known distance. Such a method or system may improve the efficiency of computer vision systems as related to moving objects, as well as autonomous systems such as self-driving vehicles (SDV), by reliably recognizing objects in a surrounding environment and taking specific operational action that may improve the efficiency and safety of a real time transportation grid.

It should be noted that "shape" as used herein may refer to a specific shape, e.g., triangle or hexagon, but may also refer to a measurement of physical properties, including but not limited to size for an object, or aspect ratio (ratio of length to width) for an object. In the context of road signs, a specific shape, or specific text that may be present, may be used to identify the object specifically and be used to decide on an operational action to take if an identified object is also determined to be relevant. However, in the course of determining relevance, the changing shape of the object may be characterized as a measurement of physical properties and should not be limited to known geometrical shapes or the relationship between a geometrical shape and known objects that may be identified.

Referring to FIG. 1, computing environment 100 contains an example of an environment for the execution of at least some of the computer code involved in performing the inventive methods, such as relevance recognition module 150. In addition to relevance recognition module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and relevance recognition module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in relevance recognition module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in relevance recognition module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to recognize relevant objects in images in real time. In particular, relevance recognition module 150 may capture an image of a surrounding environment using an appropriate device, such as a camera mounted to a vehicle or embedded in a mobile device that may be in motion. An object may be identified in the surrounding environment and specifically recognized, e.g., a road sign from a vehicle, such as a Stop sign, Do-Not-Enter sign or a posted sign with other instructions, using computer vision. Recognition of the object may include text on the object, colors or configuration of the object, as well as a shape of the object, including the aspect ratio of the recognized object. The recognized object may be compared to a database or other indexed storage entry that may contain standard values for the recognized characteristics of the object, such that a determination of relevance of the object to the entity recognizing the object may be made. For example, a Stop sign that may be on the side of a road in the United States where two lanes merge may be intended for the extreme right-hand lane, so only vehicles in that lane may determine that the sign is relevant to the vehicle. To accomplish the determination of relevance, the shape of the object, including the aspect ratio, may be determined and the movement of the object in real time in subsequent images may be monitored, such that changes in the shape or aspect ratio of the object may be tracked. The method or system may use the determination of relevance to take operational action that may be based both on the relevance determination and the specific object that is recognized. For example, if a Stop sign is recognized in a vehicle and the sign is also determined to be relevant to the vehicle, then the vehicle may be automatically slowed or stopped at or near the Stop sign.

Referring to FIG. 2, an operational flowchart illustrating a process 200 that is depicted according to at least one embodiment. At 202, the relevance recognition module 150 may capture an image of a surrounding environment using a device, e.g., a camera that may be fitted to a vehicle or a mobile device that may be carried by a person or vehicle. In a vehicle context, the device may be forward-facing, rear, or side repeater cameras that may detect objects around the vehicle or may include radar that may be installed on each side of the vehicle for obstacle detection, braking and steering assistance, autonomous driving functions, blind spot monitoring or other driving conditions. It should be noted that, while it is not required that the device is a camera, the information gathered at this step is an image of a surrounding environment that may have objects appear that may be analyzed for relevance to the device, or in the case of an autonomous vehicle, relevance to the vehicle. Therefore, while an image may be constructed from telemetry or other data from a vehicle or other entity, the process 200 requires an image to continue in the analysis.

At 204, the relevance recognition module 150 may identify an object in the image using a computer vision algorithm. The techniques that may be used at this stage may include a Convolutional Neural Network (CNN), including recognition, classification and identification of objects in the image. As an example, in an image taken with a camera mounted to an autonomous vehicle, an image that was captured may include several objects, e.g., obstructions, other vehicles or the road ahead, and street signs. In the case of a street sign, object recognition may be used to determine that the object is a street sign and then various details about the street sign. Some street signs, such as Stop or Yield, have a distinct shape that may indicate an operational action to a vehicle, while other signs may have printed text that may be recognized with text recognition and natural language processing (NLP) algorithms, which may then indicate an operational action to the vehicle. This step may also include accessing an object database, which may be a stored record of street signs that may be encountered by vehicles in the surrounding environment or may be learned through prior detection and identification in the surrounding environment or any other area, and then comparing an object in the current image to the object database to both identify the street sign specifically and also determine an operational action that should be performed if the object is relevant to the vehicle.

At 206, the relevance recognition module 150 may determine whether the object is relevant to the device/vehicle. As mentioned above, in a street sign context, many objects may be recognized in the surrounding environment, but only specific signs may be relevant to the vehicle or other entity that captured the image. Changes to the aspect ratio of the street sign, or the relation of height to width of the object in the image, may be used to make this determination. For instance, if the aspect ratio remains constant as the vehicle approaches, this may indicate that the sign directly faces the vehicle and is therefore intended for vehicles in that roadway. However, there may be signs mounted for other roadways that may be inadvertently angled such that a vehicle in another roadway may detect the sign. Examples include on-ramps to highways or other merging roadways. A changing aspect ratio, which may be detected by capturing at least one additional image as the vehicle moves, may indicate such angling. Because factors such as vandalism or weather may affect the configuration of a street sign, possibly masking a sign relevant to the vehicle with severe angling, the relevance recognition module 150 may also take into consideration any known information about a specific surrounding environment to assist in determining relevance. For example, it may be known that the roadway is under construction and, therefore, certain signs may be expected and automatically considered relevant due to this knowledge.

In an embodiment, a supervised machine learning model may be trained to predict an association between an object and the entity capturing the image from prior images of the object. One or more of the following machine learning algorithms may be used: logistic regression, naive Bayes, support vector machines, deep neural networks, random forest, decision tree, gradient-boosted tree, multilayer perceptron. One of ordinary skill in the art will recognize that this is a non-limiting list of algorithms that may be used at this step. In an embodiment, an ensemble machine learning technique may be employed that uses multiple machine learning algorithms together to assure better classification when compared with the classification of a single machine learning algorithm. In this embodiment, training data for the model may comprise any prior images of the object from the same entity or another entity. For instance, the street sign may have been mounted in the same position for many hours, days or weeks, and several vehicles may have come upon the sign. Each decision that may be taken regarding the association between the sign and the vehicle may be recorded and used as training data. As such, the training data may be collected from a single entity, e.g., vehicle, or from multiple entities or vehicles over a longer period of time. The results may be stored in a database so that the data is most current, and the output would always be up to date.

It should be noted that, in addition to aspect ratio or shape of an object, a distance to the object may also be calculated and used in the determination of relevance. The distance may be calculated by extracting known size data for the object from the object database and then using the dimensions of the object in the image over time, which may be calculated for the aspect ratio determination above, and then using known speed and direction information for the entity capturing the image.

At 208, the relevance recognition module 150 may perform an operational action based on the relevant object. Any operational action at this step would be dependent on the determination of relevance and also the specific identification of the object. For instance, if a Stop sign is identified and then is determined to be relevant, then the operational action would be indicated as stopping the vehicle. In addition, for signs that may be specific to an area or not identified previously, distinctive characteristics such as the shape of the sign, e.g., hexagon for Stop or triangle for Yield, or recognition and understanding of printed text on the sign may also be used as the operational action to perform, e.g., slowing or stopping the vehicle.

In addition to performing an operational action, the decisions about relevance may also be displayed or analyzed as a feedback mechanism for the machine learning model that determines relevance above. For example, if a Stop sign is identified and determined to be relevant based on the change in aspect ratio, this decision may be displayed to a human in the vehicle for verification. This input may be used to refine the machine learning model, such that future encounters with the object may be informed by the prior interaction of the user with the determination of relevance by the model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   capturing, using a device on an autonomous vehicle, a first image of a surrounding environment;
   identifying a first road sign and a first shape of the first road sign in the first image of the surrounding environment;
   capturing, using the device on the autonomous vehicle, a second image of the surrounding environment;
   identifying the first road sign and a second shape of the first road sign in the second image of the surrounding environment;
   determining a changing aspect ratio between the first shape of the first road sign and the second shape of the first road sign;
   determining, based on the changing aspect ratio, that the first road sign is a relevant road sign; and
   slowing, based on the first road sign, the autonomous vehicle.

2. The method of claim 1, further comprising:
   predicting an association between the first road sign in the first image and the second image of the surrounding environment to the autonomous vehicle that captured the first image and the second image, wherein the predicting is further used in the determining that the first road sign is the relevant road sign.

3. The method of claim 1, further comprising:
   identifying the relevant road sign in an object database; and
   determining an operational action from the object database, wherein the operational action is the slowing of the autonomous vehicle.

4. The method of claim 1, further comprising:

identifying text on the relevant road sign using a text recognition algorithm; and determining an operational action based on the text on the relevant road sign, wherein the operational action is the slowing of the autonomous vehicle.

5. The method of claim 1, further comprising:

displaying a determination that the first road sign is the relevant road sign to a user;

monitoring interactions of the user with the determination that the first road sign is the relevant road sign; and determining that the first road sign is the relevant road sign based on the interactions of the user.

6. A computer system comprising:

a processor set;

one or more computer readable storage media; and program instructions stored on the one or more computer readable storage media to cause the processor set to perform operations comprising:

capturing, using a device on an autonomous vehicle, a first image of a surrounding environment;

identifying a first road sign and a first shape of the first road sign in the first image of the surrounding environment;

capturing, using the device on the autonomous vehicle, a second image of the surrounding environment;

identifying the first road sign and a second shape of the first road sign in the second image of the surrounding environment;

determining a changing aspect ratio between the first shape of the first road sign and the second shape of the first road sign;

determining, based on the changing aspect ratio, that the first road sign is a relevant road sign; and slowing, based on the first road sign, the autonomous vehicle.

7. The computer system of claim 6, wherein the operations further comprise:

predicting an association between the first road sign in the first image and the second image of the surrounding environment to the autonomous vehicle that captured the first image and the second image, wherein the predicting is further used in the determining that the first road sign is the relevant road sign.

8. The computer system of claim 6, wherein the operations further comprise:

identifying the relevant road sign in an object database; and determining an operational action from the object database, wherein the operational action is the slowing of the autonomous vehicle.

9. The computer system of claim 6, wherein the operations further comprise:

identifying text on the relevant road sign using a text recognition algorithm; and determining an operational action based on the text on the relevant road sign, wherein the operational action is the slowing of the autonomous vehicle.

10. The computer system of claim 6, wherein the operations further comprise:

displaying a determination that the first road sign is the relevant road sign to a user;

monitoring interactions of the user with the determination that the first road sign is the relevant road sign; and determining that the first road sign is the relevant road sign based on the interactions of the user.

11. A computer program product comprising:

one or more computer readable storage media; and program instructions stored on the one or more computer readable storage media to perform operations comprising:

capturing, using a device on an autonomous vehicle, a first image of a surrounding environment;

identifying a first road sign and a first shape of the first road sign in the first image of the surrounding environment;

capturing, using the device on the autonomous vehicle, a second image of the surrounding environment;

identifying the first road sign and a second shape of the first road sign in the second image of the surrounding environment;

determining a changing aspect ratio between the first shape of the first road sign and the second shape of the first road sign;

determining, based on the changing aspect ratio, that the first road sign is a relevant road sign; and slowing, based on the first road sign, the autonomous vehicle.

12. The computer program product of claim 11, wherein the operations further comprise:

predicting an association between the first road sign in the first image and the second image of the surrounding environment to the autonomous vehicle that captured the first image and the second image, wherein the predicting is further used in the determining that the first road sign is the relevant road sign.

13. The computer program product of claim 11, wherein the operations further comprise:

identifying the relevant road sign in an object database; and determining an operational action from the object database, wherein the operational action is the slowing of the autonomous vehicle.

14. The computer program product of claim 11, wherein the operations further comprise:

identifying text on the relevant road sign using a text recognition algorithm; and determining an operational action based on the text on the relevant road sign, wherein the operational action is the slowing of the autonomous vehicle.

15. The computer program product of claim 11, wherein the operations further comprise:

displaying a determination that the first road sign is the relevant road sign to a user;

monitoring interactions of the user with the determination that the first road sign is the relevant road sign; and determining that the first road sign is the relevant road sign based on the interactions of the user.

* * * * *